United States Patent
Kashiwagi

(10) Patent No.: US 10,581,094 B2
(45) Date of Patent: Mar. 3, 2020

(54) FUEL CELL SYSTEM

(71) Applicant: AISIN SEIKI KABUSHIKI KAISHA, Kariya-shi (JP)

(72) Inventor: Koichi Kashiwagi, Toyokawa (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 221 days.

(21) Appl. No.: 15/799,113

(22) Filed: Oct. 31, 2017

(65) Prior Publication Data

US 2018/0269501 A1 Sep. 20, 2018

(30) Foreign Application Priority Data

Mar. 14, 2017 (JP) ................. 2017-048777

(51) Int. Cl.

| | | |
|---|---|---|
| *H01M 8/04029* | (2016.01) | |
| *H01M 8/04089* | (2016.01) | |
| *H01M 8/04119* | (2016.01) | |
| *H01M 8/04291* | (2016.01) | |
| *H01M 8/0438* | (2016.01) | |
| *H01M 8/04746* | (2016.01) | |
| *H01M 8/2465* | (2016.01) | |
| *H01M 8/124* | (2016.01) | |

(52) U.S. Cl.
CPC ... *H01M 8/04126* (2013.01); *H01M 8/04029* (2013.01); *H01M 8/04089* (2013.01); *H01M 8/04425* (2013.01); *H01M 8/04776* (2013.01); *H01M 8/2465* (2013.01); *H01M 8/04291* (2013.01); *H01M 2008/1293* (2013.01)

(58) Field of Classification Search
CPC ......... H01M 8/04029; H01M 8/04089; H01M 8/04126; H01M 8/04291; H01M 8/04425; H01M 8/04776; H01M 8/2465; H01M 2008/1293
See application file for complete search history.

(56) References Cited

U.S. PATENT DOCUMENTS

2016/0315340 A1* 10/2016 Mishima ............. H01M 8/0662

FOREIGN PATENT DOCUMENTS

| JP | 2011-127749 A | 6/2011 |
|---|---|---|
| JP | 2013-093256 A | 5/2013 |
| JP | 2014-066340 A | 4/2014 |
| JP | 59-48792 B2 | 6/2016 |

* cited by examiner

*Primary Examiner* — Anca Eoff
(74) *Attorney, Agent, or Firm* — Oblon, McClelland, Maier & Neustadt, L.L.P.

(57) ABSTRACT

A fuel cell system includes: a fuel cell which performs electric power generation using a fuel gas containing hydrogen and an oxidant gas; a first supply pipe which supplies the fuel gas to the fuel cell; a first discharge pipe which discharges a fuel off gas and water led out from the fuel cell, by electric power generation of the fuel cell, to the outside; a second supply pipe which supplies the oxidant gas to the fuel cell; and an exhaust and drain valve which is disposed in the first discharge pipe, and regulates or allows the fuel off gas and the water to be discharged to the outside. The exhaust and drain valve includes a housing, a valve body, a diaphragm, a first port, a second port, a third port, and a valve seat.

4 Claims, 4 Drawing Sheets

FUEL CELL SYSTEM

CROSS REFERENCE TO RELATED APPLICATIONS

This application is based on and claims priority under 35 U.S.C. § 119 to Japanese Patent Application 2017-048777, filed on Mar. 14, 2017, the entire contents of which are incorporated herein by reference.

TECHNICAL FIELD

This disclosure relates to a fuel cell system.

BACKGROUND DISCUSSION

An exhaust and drain valve for a fuel cell 55 used in a fuel cell system disclosed in Japanese Patent No. 5948792 (Reference 1) is disposed in a fuel system discharge pipe 51b which discharges a fuel off gas or water caused by electric power generation of a fuel cell 6 to the outside, as illustrated in FIG. 1 of Reference 1. Discharging the fuel off gas or the like to the outside is allowed or blocked by opening and closing the exhaust and drain valve for a fuel cell 55. In addition, the exhaust and drain valve for a fuel cell 55 is a diaphragm valve in which a diaphragm is used, as illustrated in FIG. 2 of Reference 1.

In the above-described fuel cell system 1 disclosed in Reference 1, a substance that causes pressure loss in a fluid may be disposed in a portion of the secondary side of the exhaust and drain valve 55 in the fuel system discharge pipe 51b. For example, a fuel cell system of Reference 1 is used for vehicles, and thus a muffler or the like equipped with a filter is disposed in the fuel system discharge pipe 51b. In this case, the pressure in the portion of the secondary side of the exhaust and drain valve 55 in the fuel system discharge pipe 51b is increased as compared with a case where the muffler or the like is not disposed, and thus a force pressing one side surface (a lower side surface) of a diaphragm portion 97b is increased so as to switch the exhaust and drain valve 55 from a closed state to an open state. In contrast, the other side surface (an upper side surface) of the diaphragm portion 97b is open to the atmosphere, and thus the pressure pressing the other side surface of the diaphragm portion 97b so as to switch the exhaust and drain valve 55 from the open state to the closed state is constant at an atmospheric pressure. Thus, in this case, the sealability of the exhaust and drain valve 55 is considered to be decreased.

Thus, a need exists for a fuel cell system which is not susceptible to the drawback mentioned above.

SUMMARY

A fuel cell system according to an aspect of this disclosure includes: a fuel cell which performs electric power generation by using a fuel gas containing hydrogen and an oxidant gas; a first supply pipe which supplies the fuel gas to the fuel cell; a first discharge pipe which discharges a fuel off gas and water led out from the fuel cell, by electric power generation of the fuel cell, to the outside; a second supply pipe which supplies the oxidant gas to the fuel cell; and an exhaust and drain valve which is disposed in the first discharge pipe, and regulates or allows the fuel off gas and the water to be discharged to the outside, in which the exhaust and drain valve includes a housing which is provided with a valve chamber therein; a valve body which is disposed in the valve chamber, and is provided to be movable between a first position and a second position which is different from the first position in a first direction; a diaphragm which is disposed so as to partition the valve chamber into a first chamber and a second chamber constituting a portion of the first discharge pipe, is connected to the valve body, and is provided in a film shape bent in accordance with the movement of the valve body; a first port which is provided to communicate with the first chamber in the housing; a second port and a third port which are provided to communicate with the second chamber in the housing, and constitute a portion of the first discharge pipe; and a valve seat which is provided in an opening portion of the second port in the second chamber, comes in contact with the valve body so as to regulate the discharge in a case where the valve body is positioned at the first position, and is separated from the valve body so as to allow the discharge in a case where the valve body is positioned at the second position, and the fuel cell system includes a branch pipe, a first end of which is connected to one of the first supply pipe and the second supply pipe, a second end of which is connected to the first port, and which supplies one of the fuel gas and the oxidant gas to the first chamber.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Figure 1:
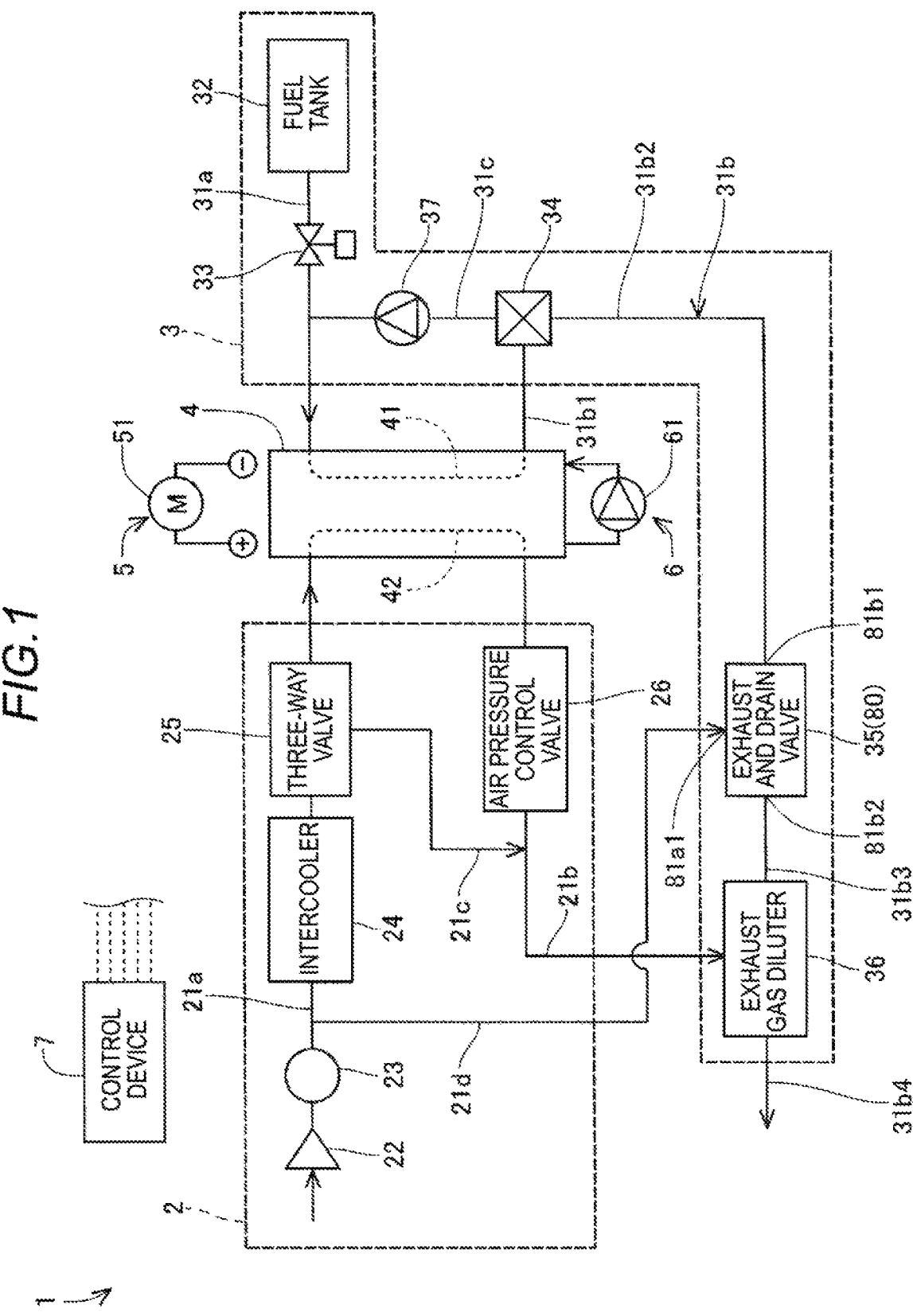
FIG. 1 is a schematic diagram of a fuel cell system according to a first embodiment disclosed here.

Hereinafter, a fuel cell system according to the first embodiment disclosed herein will be described with reference to the drawings. A fuel cell system 1 of the embodiment is applied to a vehicle. The fuel cell system 1 is provided with an oxygen system 2, a fuel system 3, a fuel cell 4, a power system 5, a cooling system 6, and a control device 7.

The fuel cell 4 performs electric power generation by using a fuel gas containing hydrogen and an oxidant gas. The type of the fuel cell 4 is formed by stacking a plurality of solid polymer type single cells, but the configuration thereof is not particularly limited. The plurality of single cells are electrically connected in series.

Each of the single cells includes an electrolyte membrane, and an anode electrode and a cathode electrode (both are not shown) interposing the electrolyte membrane therebetween. Further, an anode separator (not shown) of the single cell is provided with an anode flow path 41 for supplying the fuel gas to the anode electrode. In the exemplary embodiment, the fuel gas is a hydrogen gas containing hydrogen. Due to the electric power generation of the fuel cell 4, the fuel gas (fuel off gas) and water (water vapor) used for the electric power generation are led out from the anode flow path 41.

Further, the cathode separator (not shown) of the single cell is provided with a cathode flow path 42 (corresponding to the oxidant gas flow path disclosed herein) for supplying the oxidant gas to the cathode electrode. The cathode flow path 42 allows the oxidant gas in the fuel cell 4 to flow. In the exemplary embodiment, the oxidant gas is air. Due to the electric power generation of the fuel cell 4, the oxidant gas (oxidant off gas) used for the electric power generation is led out from the cathode flow path 42.

The oxygen system 2 is provided with an oxygen system supply pipe 21a (corresponding to a second supply pipe disclosed herein), an oxygen system discharge pipe 21b, a bypass pipe 21c, and a branch pipe 21d.

The oxygen system supply pipe 21a supplies the oxidant gas to the fuel cell 4. A first end of the oxygen system supply pipe 21a is open to the outside of the fuel cell system 1. A second end of the oxygen system supply pipe 21a is connected to a first end of the cathode flow path 42 in the fuel cell 4. The oxygen system supply pipe 21a to which the oxidant gas (air) is introduce d supplies the oxidant gas from the first end to the fuel cell 4. On the oxygen system supply pipe 21a, an air filter 22, an air compressor 23, an intercooler 24, and a three-way valve 25 are disposed in order from the first end to the fuel cell 4.

The air filter 22 removes dust or the like contained in the oxidant gas. The air compressor 23 compresses and leads out the oxidant gas from the first end of the oxygen system supply pipe 21a toward the second end thereof and the fuel cell 4. The intercooler 24 cools the oxidant gas. The three-way valve 25 is a three-port fluid control valve.

The oxygen system discharge pipe 21b to which the oxidant gas (oxidant off gas) used for the electric power generation is introduced from the cathode flow path 42 leads out the oxidant off gas in the portion of the secondary side of an exhaust and drain valve 35 (described below) in a fuel system discharge pipe 31b (described below).

The first end of the oxygen system discharge pipe 21b is connected to a second end of cathode flow path 42. The second end of the oxygen system discharge pipe 21b is connected to a discharged gas diluter 36 (described below) which is disposed in the portion of the secondary side of the exhaust and drain valve 35 in the fuel system discharge pipe 31b. In the oxygen system discharge pipe 21b, an air pressure control valve 26 which is a two-port pressure control valve is disposed.

The oxygen system discharge pipe 21b and the cathode flow path 42 constitute a lead-out pipe disclosed herein. That is, the lead-out pipe to which the oxidant gas is introduced from the oxygen system supply pipe 21a leads out the oxidant gas (oxidant off gas) to the portion of the secondary side (the discharged gas diluter 36) of the exhaust and drain valve 35 in the fuel system discharge pipe 31b.

In addition, the cathode flow path 42 is configured to include a small flow path cross-sectional area as compared with the oxygen system supply pipe 21a and the oxygen system discharge pipe 21b. Therefore, the cathode flow path 42 is provided in the lead-out pipe, causes pressure loss in the oxidant gas, and thus corresponds to a pressure loss portion disclosed here. Note that, the air pressure control valve 26 is also provided in the lead-out pipe, causes pressure loss in the oxidant gas, and thus corresponds to the pressure loss portion disclosed here.

The bypass pipe 21c is connected to the three-way valve 25 and a portion of the secondary side of the air pressure control valve 26 in the oxygen system discharge pipe 21b. The oxidant gas led out from the three-way valve 25 is led out to the portion of the secondary side of the air pressure control valve 26 in the oxygen system discharge pipe 21b via the bypass pipe 21c.

In addition, the bypass pipe 21c to which the oxidant gas is introduced from the oxygen system supply pipe 21a via the three-way valve 25 leads out the oxidant gas to the portion of the secondary side (the discharged gas diluter 36) of the exhaust and drain valve 35 in the fuel system discharge pipe 31b via the oxygen system discharge pipe 21b, and thus corresponds to the lead-out pipe disclosed here.

The branch pipe 21d is a pipe in which a first end is connected to the oxygen system supply pipe 21a, and a second end is connected to a first port 81a1 (described below) of the exhaust and drain valve 35. The first end of the branch pipe 21d is connected to, specifically, a portion between the air compressor 23 and the intercooler 24 in the oxygen system supply pipe 21a. The branch pipe 21d leads out the oxidant gas from the oxygen system supply pipe 21a to the first port 81a1 of the exhaust and drain valve 35.

The fuel system 3 is provided with a fuel system supply pipe 31a (corresponding to a first supply pipe disclosed herein) and a fuel system discharge pipe 31b (corresponding to a first discharge pipe disclosed herein).

The fuel system supply pipe 31a supplies the fuel gas to the fuel cell 4. A first end of the fuel system supply pipe 31a is connected to a fuel tank 32. A second end of the fuel system supply pipe 31a is connected to a first end of the anode flow path 41 in the fuel cell 4. The fuel gas is stored in the fuel tank 32 at a predetermined pressure.

In the fuel system supply pipe 31a, a shutoff valve 33 is disposed. The shutoff valve 33 allows the fuel gas to be shut off or supplied to the fuel cell 4. In a case where the shutoff valve 33 is in a closed state, the supplying of the fuel gas to the fuel cell 4 is shut off. In a case where the shutoff valve 33 is in an open state, due to the pressure in the fuel tank 32, the fuel gas is supplied to the fuel cell 4 via the fuel system supply pipe 31a.

The fuel system discharge pipe 31b discharges the fuel off gas and the water led out from the fuel cell 4 to the outside by the electric power generation of the fuel cell 4. A first end of the fuel system discharge pipe 31b is connected to the second end of the anode flow path 41. A second end of the fuel system discharge pipe 31b is open to the outside of the fuel cell system 1.

In the fuel system discharge pipe 31b, a gas-liquid separator 34, the exhaust and drain valve 35 (80), and the discharged gas diluter 36 are disposed in order from the side close to the fuel cell 4. In addition, the fuel system discharge pipe 31b is provided with a first fuel system discharge pipe 31b1, a second fuel system discharge pipe 31b2, a third fuel system discharge pipe 31b3, and a fourth fuel system discharge pipe 31b4. The first fuel system discharge pipe 31b1 is a portion of the fuel system discharge pipe 31b which connects the fuel cell 4 and the gas-liquid separator 34 to each other. The second fuel system discharge pipe 31b2 is a portion of the fuel system discharge pipe 31b which connects the gas-liquid separator 34 and the exhaust and drain valve 35 to each other. The third fuel system discharge pipe 31b3 is a portion of the fuel system discharge pipe 31b which connects the exhaust and drain valve 35 and the discharged gas diluter 36 to each other. The fourth fuel system discharge pipe 31b4 is a portion of the fuel system discharge pipe 31b which connects the discharged gas diluter 36 to the outside.

The gas-liquid separator 34 separates fuel off gas and water.

The exhaust and drain valve 35 is disposed in the fuel system discharge pipe 31*b* and regulates or allows discharge of the fuel off gas and the water to the outside. Details of the exhaust and drain valve 35 will be described below.

The discharged gas diluter 36 is disposed in the portion of the secondary side of the exhaust and drain valve 35 in the fuel system discharge pipe 31*b*. The discharged gas diluter 36 dilutes the fuel off gas discharged to the outside from the exhaust and drain valve 35. The discharged gas diluter 36 dilutes the fuel off gas using an oxidant off gas led out from the oxygen system discharge pipe 21*b*. In the discharged gas diluter 36, the oxygen system discharge pipe 21*b*, the third fuel system discharge pipe 31*b*3, the fourth fuel system discharge pipe 31*b*4, and the outside communicate with each other.

In addition, the fuel system 3 is further provided with a fuel system circulation path 31*c* (corresponding to a connecting pipe disclosed herein) and a circulation pump 37 (corresponding to a fuel off gas discharging device disclosed herein).

The fuel system circulation path 31*c* connects a portion between the fuel cell 4 and the exhaust and drain valve 35 in the fuel system discharge pipe 31*b* and the fuel system supply pipe 31*a*. Specifically, the fuel system circulation path 31*c* connects the gas-liquid separator 34 and a connecting portion of the shutoff valve 33 and the anode flow path 41 in the fuel system supply pipe 31*a* to each other.

The circulation pump 37 is disposed in the fuel system circulation path 31*c*, and supplies the fuel off gas to the fuel system supply pipe 31*a* from the fuel system discharge pipe 31*b* (the gas-liquid separator 34). The fuel gas is circulated from the gas-liquid separator 34 to the anode flow path 41 by the circulation pump 37.

The power system 5 is provided with an electric motor 51 for running the vehicle. The electric motor 51 is connected to the positive electrode and the negative electrode of the fuel cell 4, and is driven by the electric power generation of the fuel cell 4. The cooling system 6 is provided with a water cooling pump 61. The cooling system 6 circulates cooling water in the fuel cell 4 so as to cool the fuel cell 4.

The control device 7 centrally controls the fuel cell system 1. The control device 7 is electrically connected to the air compressor 23, the three-way valve 25, the air pressure control valve 26, the shutoff valve 33, the circulation pump 37 and the water cooling pump 61. The control device 7 controls the operation of each of these components based on the necessary electric power generation amount of the fuel cell 4 calculated according to the running state of the vehicle.

With the above-described configuration, when the vehicle starts to operate, the control device 7 operates the air compressor 23 so as to supply the oxidant gas to the cathode flow path 42. Also, the control device 7 sets the shutoff valve 33 to the open state and drives the circulation pump 37 to supply the fuel gas to the anode flow path 41. With these, the electric power generation is performed in the fuel cell 4.

In the oxygen system 2, the oxygen-containing oxidant gas aspirated through the air filter 22 is compressed in the air compressor 23 and then cooled by the intercooler 24. The three-way valve 25 controls the flow rate of oxidant gas to the fuel cell 4 by diverting the oxidant gas supplied from the intercooler 24 to the bypass pipe 21*c* according to the control command from the control device 7 based on the electric power generation amount of the fuel cell 4. In addition, the air pressure control valve 26 controls the pressure in the fuel cell 4 by adjusting an opening degree and the discharge amount of the oxidant gas remaining in the fuel cell 4.

The fuel off gas and water discharged from the anode flow path 41 is separated by the gas-liquid separator 34. The fuel off gas separated by the gas-liquid separator 34 is supplied to the fuel system supply pipe 31*a* via the fuel system circulation path 31*c* and then circulated by the circulation pump 37.

On the other hand, the water (liquid state) separated by the gas-liquid separator 34 is supplied to the discharged gas diluter 36 together with the fuel off gas when the exhaust and drain valve 35 is in the open state. In the discharged gas diluter 36, the fuel off gas is diluted with the oxidant gas supplied from the oxygen system discharge pipe 21*b*, and then is discharged to the outside together with water.

Figure 2:
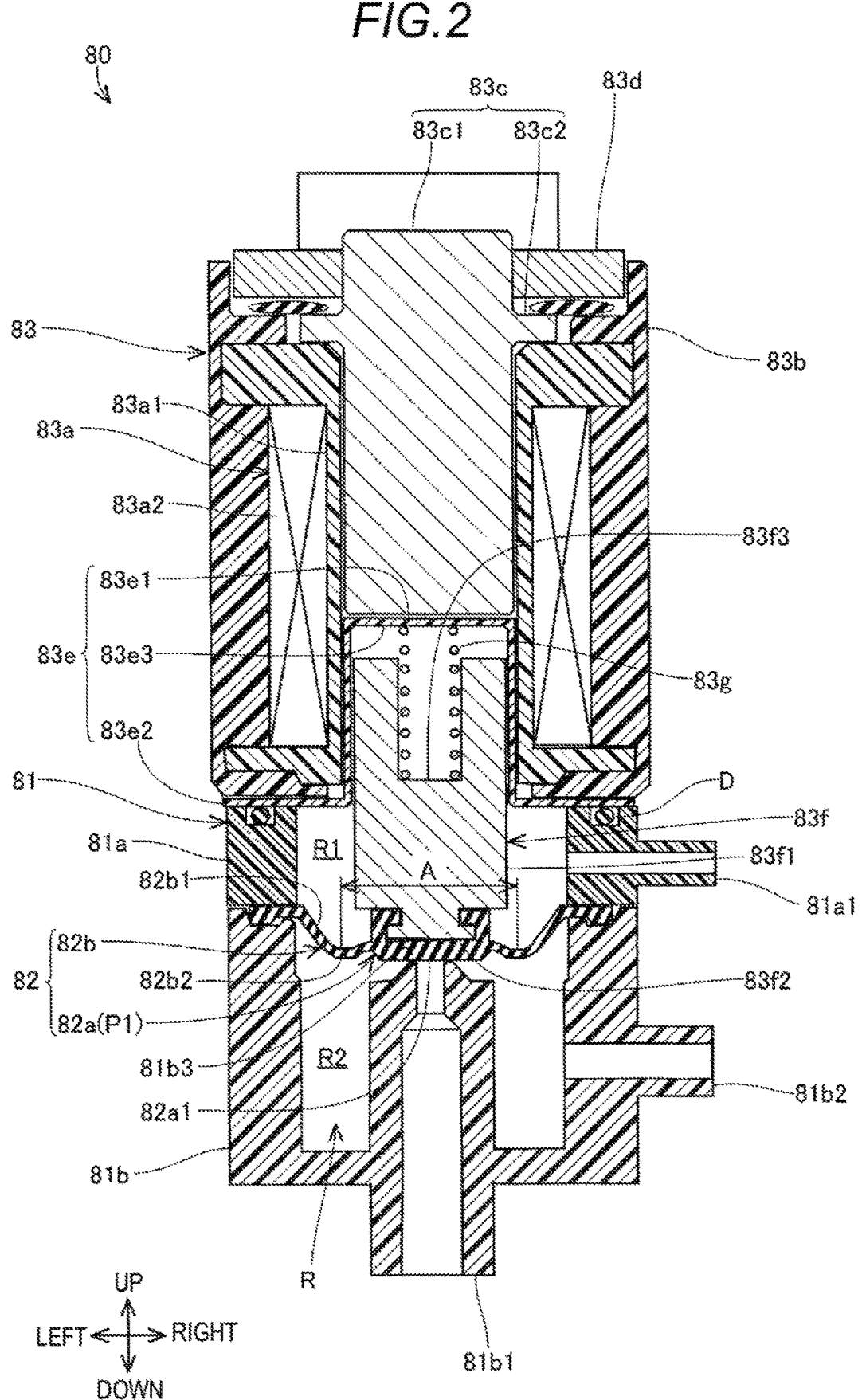
FIG. 2 is a sectional view of an exhaust and drain valve in an axial direction as illustrated in FIG. 1, and illustrates a case where the exhaust and drain valve is in a closed state.

Next, an exhaust and drain valve 80 will be described in detail with reference to FIG. 2. For the sake of simplicity, the upper side and the lower side in FIG. 2 are defined as the upper side and the lower side of the exhaust and drain valve 80, and the right side and the left side in FIG. 2 are defined as the right side and the left side of the three-way valve 25. These directions are not related to the actual mounting direction of the exhaust and drain valve 80 in the vehicle.

The exhaust and drain valve 80 is provided with a housing 81, a diaphragm valve body 82, and a drive portion 83.

The housing 81 is provided with a valve chamber R therein. The housing 81 is formed of a synthetic resin material such as polyphenylene sulfide and has a bottomed tubular shape. The valve chamber R is partitioned into a first chamber R1 and a second chamber R2 by the diaphragm valve body 82. The first chamber R1 constitutes an upper side of the valve chamber R. The second chamber R2 constitutes a lower side of the valve chamber R.

The housing 81 is provided with a first housing 81*a* and a second housing 81*b*. The first housing 81*a* is provided with a first port 81*a*1. The second housing 81*b* is provided with a second port 81*b*1 and a third port 81*b*2.

The first housing 81*a* constitutes the upper side of the housing 81, and is formed into a tubular shape with both upper and lower ends open. The second housing 81*b* constitutes the lower side of the housing 81 and is formed into a bottomed tubular shape with the upper side open. The first housing 81*a* and the second housing 81*b* are coupled by a screw or the like, for example.

The first port 81*a*1 is provided to communicate with the first chamber R1 in the first housing 81*a*. The first port 81*a*1 is provided in a tubular shape extending radially outward from a peripheral side wall of the first housing 81*a*. The first port 81*a*1 is connected to the second end of the branch pipe 21*d* (refer to FIG. 1). With this, the branch pipe 21*d* supplies the oxidant gas from the oxygen system supply pipe 21*a* to the first port 81*a*1 and the first chamber R1.

The second port 81*b*1 is provided to communicate with the second chamber R2 in the second housing 81*b*, and constitutes a portion of the fuel system discharge pipe 31*b*. The second port 81*b*1 is provided in a tubular shape penetrating a bottom wall of the second housing 810 in the vertical direction. The second port 81*b*1 is connected to the second fuel system discharge pipe 31*b*2 so as to introduce the fuel off gas and the water to the second chamber R2 (refer to FIG. 1).

The third port 81*b*2 is provided to communicate with the second chamber R2 in the second housing 81*b*, and constitutes a portion of the fuel system discharge pipe 31*b*. The third port 81*b*2 is provided in a tubular shape extending radially outward from a peripheral side wall of the second housing 81*b*. The third port 81*b*2 is connected to the third fuel system discharge pipe 31*b*3 so as to lead out the fuel off gas and the water from the second chamber R2 (refer to FIG. 1).

As such, the exhaust and drain valve 80 is disposed in the fuel system discharge pipe 31*b* so as to introduce the fuel off gas and the water from the second port 81*b*1 and lead out the fuel off gas and the water to the third port 81*b*2. In other words, in the exhaust and drain valve 80, the fuel off gas and the water discharged from the fuel cell 4 flow in order from the second port 81*b*1, the second chamber R2, and the third port 81*b*2. The second port 81*b*1, the second chamber R2, and the third port 81*b*2 constitute a portion of the fuel system discharge pipe 31*b*.

The diaphragm valve body 82 is provided with a valve portion 82*a* (corresponding to a valve body disclosed herein) and a diaphragm portion 82*b* (corresponding to a diaphragm disclosed herein). The valve portion 82*a* and the diaphragm portion 82*b* are integrally formed by an elastic member such as a synthetic rubber material.

The valve portion 82*a* is disposed in the valve chamber R, and is provided to be movable between a first position P1 and a second position P2 different from the first position P1 in the vertical direction (corresponding to a first direction disclosed herein). The valve portion 82*a* is provided in a center portion of the diaphragm valve body 82. The first position P1 is a position at which the valve portion 82*a* and the valve seat 81*b*3 (described below) are in contact with each other. The second position P2 is a position at which the valve portion 82*a* and the valve seat 81*b*3 are separated from each other (refer to FIG. 3). The lower end surface 82*a*1 of the valve portion 82*a* is provided in a planar shape so as to be in contact with the valve seat 81*b*3.

The valve seat 81*b*3 is provided in an opening portion of the second port 81*b*1 in the second chamber R2. The opening portion of the second port 81*b*1 is formed in a tapered shape that decreases a diameter toward the upper side. The valve seat 81*b*3 is formed into a ring shape at a tip end portion of the opening portion of the second port 81*b*1. In a case where the valve portion 82*a* is positioned at the first position P1, the valve seat 81*b*3 comes in contact with the valve portion 82*a* so as to regulate discharging the fuel off gas and the water to the outside. In addition, in a case where the valve portion 82*a* is positioned at the second position P2, the valve seat 81*b*3 is separated from the valve portion 82*a* and allows the fuel off gas and the water to be discharged to the outside (details will be described below).

The diaphragm portion 82*b* is connected to the valve portion 82*a*, and is provided in a film shape bent in accordance with the movement of the valve portion 82*a*. The valve portion 82*a* is integrally provided with the diaphragm portion 82*b* in the center portion of the diaphragm portion 82*b*. An outer peripheral edge of the diaphragm portion 82*b* is disposed between the peripheral side wall of the first housing 81*a* and the peripheral side wall of the second housing 81*b*. In this way, the diaphragm portion 82*b* is disposed so as to partition the valve chamber R into the first chamber R1 and the second chamber R2 constituting a portion of the fuel system discharge pipe 31*b*. Further, with this, the diaphragm portion 82*b* airtightly and liquid tightly seals a space between the first housing 81*a* and the second housing 81*b*.

The drive portion 83 moves the valve portion 82*a* in the vertical direction by being energized. The drive portion 83 is fixed to the housing 81 by a screw or the like. The drive portion 83 is provided with a coil portion 83*a*, a cover portion 83*b*, a core member 83*c*, a holding member 83*d*, a sleeve 83*e*, a plunger 83*f*, and a spring 83*g*.

The coil portion 83*a* is formed of a bobbin 83*a*1 having a tubular shape and a solenoid coil 83*a*2 in which a conductive wire is wound cylindrically around the outer peripheral surface of the bobbin 83*a*1. The coil portion 83*a* forms a magnetic field when the solenoid coil 83*a*2 is energized. The cover portion 83*b* forms an outline of the drive portion 83. The cover portion 83*b* is formed of, for example, a nylon-based resin material.

The core member 83*c* is formed of, for example, a magnetic material such as a ferritic stainless steel. The core member 83*c* is formed of a pillar portion 83*c*1 and a flange 83*c*2. The pillar portion 83*c*1 is provided in a columnar shape, and is disposed in a portion on the upper side inside of the coil portion 83*a*. The flange 83*c*2 is formed into a flange shape projecting in the radial direction from the side surface of the pillar portion 83*c*1 and disposed so as to contact the upper side of the coil portion 83*a*.

The holding member 83*d* is formed of a magnetic material such as electromagnetic stainless steel, for example. The holding member 83*d* is fixed to the drive portion 83 by a screw or the like, and holds the core member 83*c*. The holding member 83*d* and the core member 83*c* function as a yoke constituting a magnetic circulation path through which a magnetic flux flows.

The sleeve 83*e* is provided with a cylindrical portion 83*e*1 and a flange 83*e*2. The cylindrical portion 83*e*1 and the flange 83*e*2 are, for example, formed integrally with a nonmagnetic material such as austenitic stainless steel.

The cylindrical portion 83*e*1 is disposed in a portion on the lower side of the inside of the coil portion 83*a*. The cylindrical portion 83*e*1 is formed into a cylindrical shape with the lower side open. The plunger 83*f* is accommodated in a cylindrical portion 83*e*1 so as to be capable of reciprocating in the vertical direction.

The flange 83*e*2 is formed into a flange shape projecting radially outward from the lower end of the cylindrical portion 83*e*1 over the entire circumference. The flange 83*e*2 is disposed between the lower side surface of the cover portion 83*b* and the upper side surface of the first housing 81*a*. In addition, an elastic body D in a ring shape such as an O ring is disposed between the flange 83*e*2 and the first housing 81*a*. The elastic body D airtightly and liquid tightly seals a space between the sleeve 83*e* and the first housing 81*a*.

The plunger 83*f* is formed of, for example, a magnetic material of ferritic stainless steel and stored in the cylindrical portion 83*e*1 so as to be capable of reciprocating in the vertical direction. The plunger 83*f* is provided with a cylindrical column portion 83*f*1, a projection portion 83*f*2, and a recessed portion 83*f*3.

The cylindrical column portion 83*f*1 is disposed such that the upper side portion thereof is positioned inside the coil portion 83*a*. In addition, the cylindrical column portion 83*f*1 and the cylindrical portion 83*e*1 are formed such that the outer peripheral surface of the cylindrical column portion 83*f*1 and the inner peripheral surface of the cylindrical portion 83*e*1 are in slidably contact with each other. In addition, the upper end surface of the cylindrical column portion 83*f*1 is disposed so as to be in contact with an inner surface 83*e*3 (hereinafter, referred to as a contact surface 83*e*3) of an upper side wall of the cylindrical portion 83*e*1. A position where the upper end surface of the cylindrical column portion 83*f*1 and the contact surface 83*e*3 are in contact with each other corresponds to the second position P2 of the valve portion 82*a* (refer to FIG. 3).

The projection portion 83*f*2 is provided to project downward from the lower end surface of the cylindrical column portion 8311. The projection portion 83f2 is disposed so as to be entirely positioned in the valve portion 82a. In addition, the lower end portion of the projection portion 8312 is formed into a flange shape extending radially outward such that the projection portion 83f2 does not come off from the valve portion 82a. Further, with this, the valve portion 82a moves as the plunger 83f moves.

The recessed portion 8313 is provided so as to be recessed downward from the upper end surface of the cylindrical column portion 83f1. A spring 83g is disposed between the inside of the recessed portion 83f3 and the bottom surface of the recessed portion 83f3, and the contact surface 83e3. The spring 83g urges the plunger 83f downward.

Next, an operation of the exhaust and drain valve 80 will be described. First, a case where the exhaust and drain valve 80 is in a closed state will be described. The closed state of the exhaust and drain valve 80 means a state where the valve portion 82a and the valve seat 81b3 are in contact with each other so as to regulate discharging of the fuel off gas and the water to the outside, as illustrated in FIG. 2. In a case of a non-energized state where the coil portion 83a is not energized, the exhaust and drain valve 80 becomes in the closed state.

In a case where the coil portion 83a is in the non-energized state, a force downwardly acting on the plunger 83f is a sum of a first load which is the forced caused by the pressure acting on the upper side surface 82b1 of the diaphragm portion 82b, and a spring load which is the force caused by spring 83g.

Since the first port 81a1 is connected to the branch pipe 21d, the pressure of the oxidant gas (the supply pressure of the oxidant gas) supplied by the compressor acts on the first chamber R1 and the upper side surface 82b1 of the diaphragm portion 82b. Accordingly, the first load is obtained by multiplying the supply pressure of the oxidant gas and an effective pressure receiving area of the diaphragm portion 82b. The effective pressure receiving area of the diaphragm portion 82b is an area when the radially inner range connecting the lowermost point of the bending portion of the diaphragm portion 82b is projected onto the plane orthogonal to the vertical direction. The effective pressure receiving area of the diaphragm portion 82b is, specifically, is the area of a circle whose diameter is A.

On the other hand, the force upwardly acting on the plunger 83f is a sum of a second load which is the forced caused by the pressure acting on the lower end surface 82a1 of the valve portion 82a, and a third load which is the force acting on the lower side surface 82b2 of the diaphragm portion 82b.

Since the second port 81b1 is connected to the anode flow path 41 via the second fuel system discharge pipe 31b2, the gas-liquid separator 34, and the first fuel system discharge pipe 31b1, the pressure (discharge pressure of the fuel off gas) of the fuel off gas of discharged from the anode flow path 41 acts on the inside of the second port 81b1 and the lower end surface 82a1 of the valve portion 82a. Accordingly, the second load is obtained by multiplying the discharge pressure of the fuel off gas and the effective pressure receiving area of the lower end surface 82a1 of the valve portion 82a. The effective pressure receiving area of the lower end surface 82a1 of the valve portion 82a is an area when the radially inner range being in contact with the valve seat 81b3 in the lower end surface 82a1 of the valve portion 82a.

In addition, the third port 81b2 is connected to the outside via the third fuel system discharge pipe 31b3, the discharged gas diluter 36, and the fourth fuel system discharge pipe 31b4, the atmospheric pressure acts on the second chamber R2 and the lower side surface 82b2 of the diaphragm portion 82b. Accordingly, the third load is obtained by multiplying the atmospheric pressure and the effective pressure receiving area of the diaphragm portion 82b. As described above, the first load is obtained by multiplying the supply pressure of the oxidant gas the effective pressure receiving area of the diaphragm portion 82b. The supply pressure of the oxidant gas is higher than the atmospheric pressure, and thus the first load is larger than the third load.

In a case where the exhaust and drain valve 80 is in the closed state, a resultant force acting on the plunger 83f is obtained by subtracting the sum of the second load and the third load from the sum of the first load and the spring force. Further, the resultant force corresponds to a sealing force which is a force that allows the valve portion 82a to be positioned at the first position P1 and the valve portion 82a and the valve seat 81b3 to be in contact each other to regulate the discharging of the fuel off gas and the water to the outside.

As in the related art, in a case where the first chamber R1 is open to the atmosphere, the pressures of the first chamber R1 and the second chamber R2 are both the atmospheric pressure, and thus the first load and the third load are equivalent to each other. In contrast, in the exemplary embodiment, as described above, when the supply pressure of the oxidant gas acts on the first chamber R1, the first load is larger than the third load, and thus the sealing force is increased.

Figure 3:
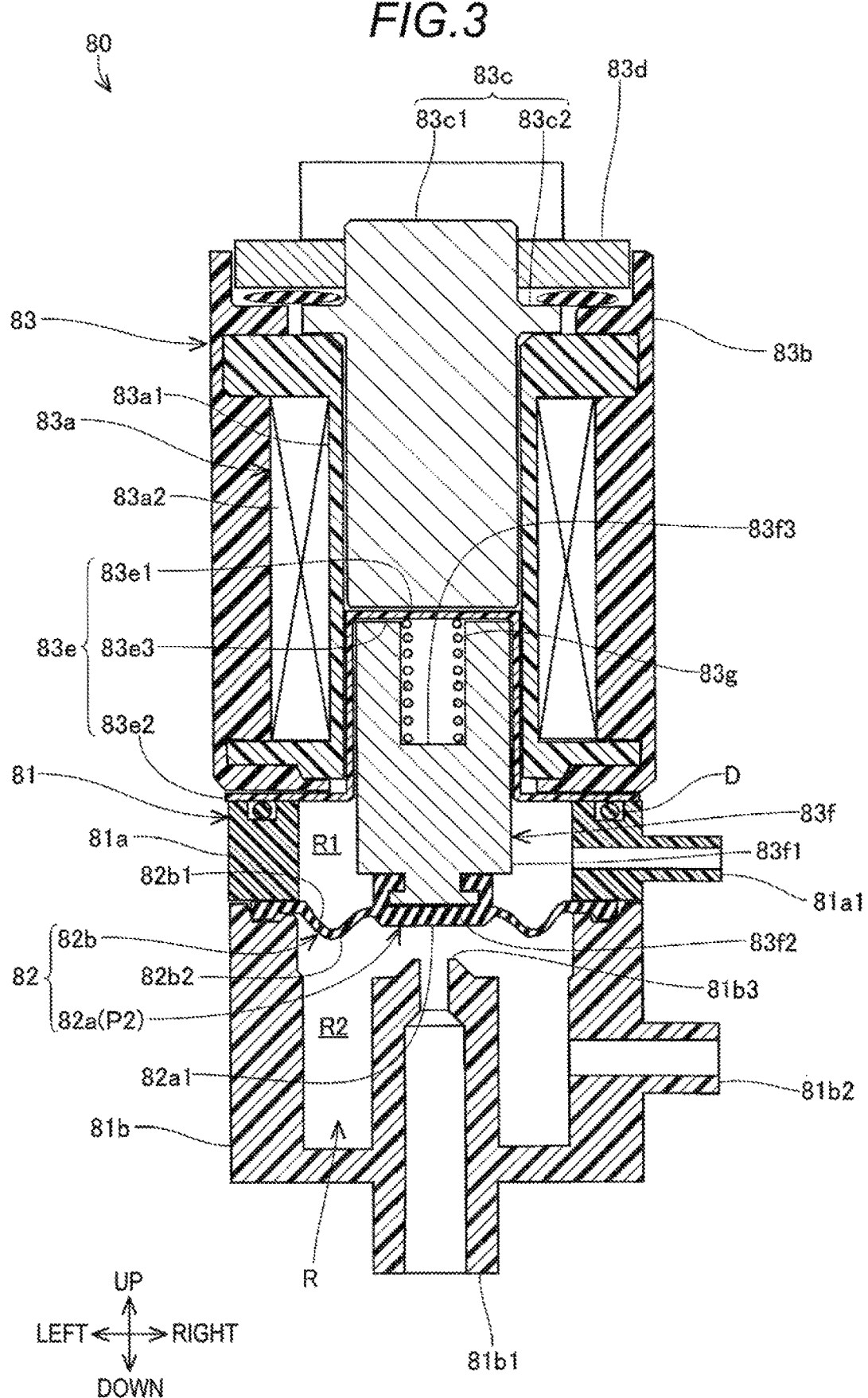
FIG. 3 is a sectional view of the exhaust and drain valve in the axial direction as illustrated in FIG. 1, and illustrates a case where the exhaust and drain valve is in an open state.

In a case where coil portion 83a is energized and becomes in an energized state, the exhaust and drain valve 80 is switched from the closed state to the open state where the fuel off gas and the water is allowed to be discharged to the outside, as illustrated in FIG. 3.

A fourth load acts to pull up the plunger 831f upward by the magnetic field generated by energizing the coil portion 83a. The specifications of the drive portion 83 are set such that the fourth load is larger than the sealing force.

When the coil portion 83a is energized, the plunger 83f upwardly moves, and the valve portion 82a is positioned at the second position P2. With this, the valve portion 82a and the valve seat 81b3 separated from each other such that the second port 81b1 and the third port 81b2 communicate with each other via the second chamber R2. With this, the fuel off gas and the water discharged from the anode flow path 41 are discharged to the outside via the fuel system discharge pipe 31b.

According to the first embodiment, the fuel cell system 1 is provided with a fuel cell 4 which performs electric power generation by using a fuel gas containing hydrogen and an oxidant gas; a fuel system supply pipe 31a which supplies the fuel gas to the fuel cell 4; a fuel system discharge pipe 31b which discharges the fuel off gas and the water led out from the fuel cell 4 to the outside by the electric power generation of the fuel cell 4; an oxygen system supply pipe 21a which supplies the oxidant gas to the fuel cell 4; and an exhaust and drain valve 80 which is disposed in the fuel system discharge pipe 31b, and regulates or allows to the fuel off gas and the water to be discharged to the outside. The exhaust and drain valve 80 is provided with a housing 81 which is provided with a valve chamber R therein; a valve portion 82a which is disposed in the valve chamber R, and is provided to be movable between a first position P1 and a second position P2 which is different from the first position P1 in the vertical direction; a diaphragm portion 82b which is disposed so as to partition the valve chamber R into the first chamber R1 and the second chamber R2 constituting a portion of the fuel system discharge pipe 31b, is connected to the valve portion 82a, and is provided in a film shape bent in accordance with the movement of the valve portion 82a; a first port 81a1 which is provided to communicate with the first chamber R1 in the housing 81; a second port 81b1 and a third port 81b2 which are provided to communicate with the second chamber R2 in the housing 81, and constitute a portion of the fuel system discharge pipe 31b; and a valve seat 81b3 which is provided in an opening portion of the second port 81b1 in the second chamber R2, comes in contact with the valve portion 82a so as to regulate the discharge in a case where the valve portion 82a is positioned at the first position P1, and is separated from the valve portion 82a in a case where the valve portion 82a is positioned at the second position P2 so as to allow the discharge, in which the fuel cell system 1 includes a branch pipe 21d is a pipe in which a first end is connected to the oxygen system supply pipe 21a, a second end is connected to the first port 81a1, and the oxidant gas is supplied to the first chamber R1.

According to this aspect, the branch pipe 21d supplies the oxidant gas to the first chamber R1 of the exhaust and drain valve 80, and the supply pressure of the oxidant gas acts on the first chamber R1. Accordingly, as compared with the case where the first chamber R1 is open to the atmosphere as in the related art, the pressure acting on the first chamber R1 can be large. In addition, the pressure of the first chamber R1 acts in the direction (lower direction) allows the valve portion 82a and the valve seat 81b3 to be in contact with each other in the first direction with respect to the diaphragm portion 82b.

Thus, the sealing force which is the force that allows the valve portion 82a and the valve seat 81b3 to be in contact each other to regulate the discharging of the fuel off gas and the water to the outside is increased. Accordingly, it is possible to improve the sealability of the exhaust and drain valve 80.

Further, the fuel cell system 1 is further provided with a lead-out pipe (a cathode flow path 42, an oxygen system discharge pipe 21b, and a bypass pipe 21c) to which the oxidant gas is introduced from the oxygen system supply pipe 21a leads out the oxidant gas to the portion of the secondary side of the exhaust and drain valve 80 in the fuel system discharge pipe 31b; and a pressure loss portion (the cathode flow path 42 and an air pressure control valve 26) which is provided in the lead-out pipe, and causes pressure loss in the oxidant gas. The exhaust and drain valve 80 is disposed in the fuel system discharge pipe 31b so as to introduce the fuel off gas and the water from the second port 81b1 and lead out the fuel off gas and the water to the third port 81b2. The branch pipe 21d is a pipe in which the first end is connected to the oxygen system supply pipe 21a, and the oxidant gas is supplied to the first chamber R1.

According to this aspect, the pressure value of the oxidant gas led out from the lead-out pipe is lower than the supply pressure value of the oxidant gas due to the pressure loss portion. Thus, in a case where the exhaust and drain valve 80 is in the closed state, even when the pressure of the oxidant gas (oxidant off gas) acts on the third fuel system discharge pipe 31b3, the second chamber R2, and the lower side surface 82b2 of the diaphragm portion 82b via the lead-out pipe, the pressure value of the oxidant gas is lower than the supply pressure value of the oxidant gas acting on the first chamber R1 and the upper side surface 82b1 of the diaphragm portion 82b via the branch pipe 21d. With this, the first load which acts downward on the plunger 83f and the valve portion 82a reliably becomes lager than the third load acting upward on the plunger 83f and the valve portion 82a. Accordingly, it is possible to reliably improve the sealability of the exhaust and drain valve 80.

In addition, the pressure loss portion is the cathode flow path 42 which allows the oxidant gas in the fuel cell 4 to flow.

According to this, when the oxidant gas passes through the cathode flow path 42, the pressure value of the oxidant gas surely decreases. Therefore, it is possible to reliably improve the sealability of the exhaust and drain valve 80.

Second Embodiment

Figure 4:
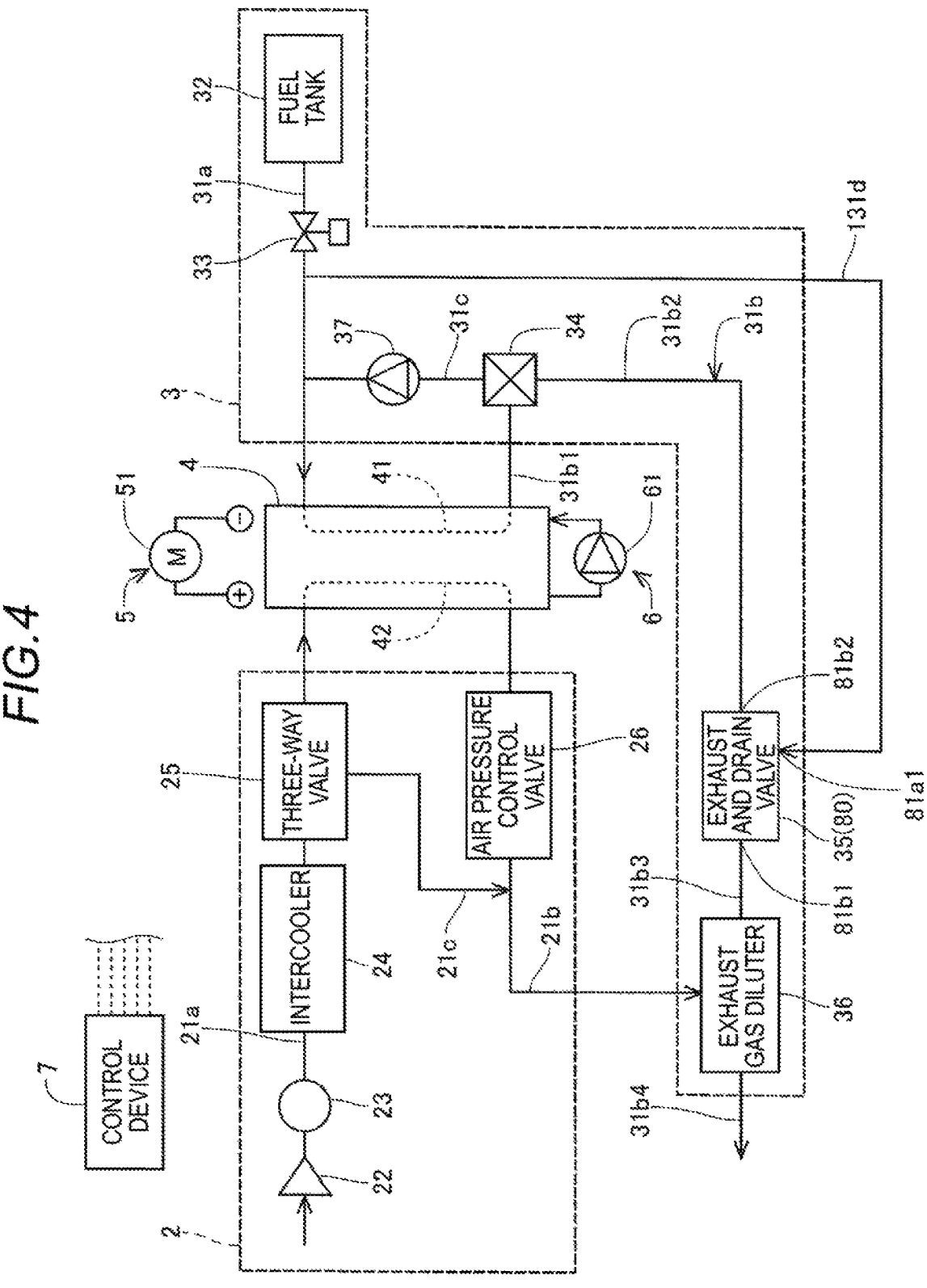
FIG. 4 is a schematic diagram of a fuel cell system of a second embodiment disclosed here.

Next, regarding a fuel cell system 1 according to the second embodiment disclosed herein, portions different from the above-described first embodiment will mainly be described. The branch pipe 21d of the first embodiment is a pipe in which the first end is connected to the oxygen system supply pipe 21a, the second end is connected to the first port 81a1, and the oxidant gas is supplied to the first chamber R1. In contrast, a branch pipe 131d of the second embodiment is a valve in which the first end is connected to the fuel system supply pipe 31a, and the second end is connected to the first port 81a1, and which supplies the fuel gas to the first chamber R1, as illustrated in FIG. 4.

The first end of the branch pipe 131d is connected to, specifically, a connecting portion of the shutoff valve 33 in the fuel system supply pipe 31a, and the fuel system circulation path 31c. The second end of the branch pipe 131d is connected to the first port 81a1 of the exhaust and drain valve 80. With this, the branch pipe 131d supplies the fuel gas from the fuel system supply pipe 31a to the first chamber R1. Accordingly, the pressure (the supply pressure of the fuel gas) of the fuel gas supplied by the pressure in the fuel tank 32 acts on the first chamber R1 and the upper side surface 82b1 of the diaphragm portion 82b. With this, the first load downwardly acting on the plunger 83f is obtained by multiplying the supply pressure of the fuel gas by the effective pressure receiving area of the diaphragm portion 82b.

In addition, the exhaust and drain valve 80 in the above-described first embodiment is disposed in the fuel system discharge pipe 31b so as to introduce the fuel off gas and the water from the second port 81b1 and lead out the fuel off gas and the water to the third port 81b2. In contrast, the exhaust and drain valve 80 of the second embodiment is disposed in the fuel system discharge pipe 31b so as to introduce the fuel off gas and the water from the third port 81b2 and lead out the fuel off gas and the water to the second port 81b1. Specifically, the third fuel system discharge pipe 31b3 is connected to the second port, and the second fuel system discharge pipe 31b2 is connected to the third port. That is, in the exhaust and drain valve 80, the fuel off gas and the water discharged from the fuel cell 4 flows in order of the third port 81b2, the second chamber R2, and the second port 81b1.

In a case where the exhaust and drain valve 80 is in the closed state, the third port 81b2 is connected to the anode flow path 41 of the fuel cell 4 via the second fuel system discharge pipe 31b2, the gas-liquid separator 34, and the first fuel system discharge pipe 31b1, and thus the discharge pressure of the fuel off gas acts on the second chamber R2 and the lower side surface 82b2 of the diaphragm portion 82b. Accordingly, the third load upwardly acting on the plunger 83f is obtained by multiplying the discharge pressure of the fuel off gas and the effective pressure receiving area of the diaphragm portion 82b.

In addition, the fuel off gas is circulated as described above, and thus the discharge pressure value of the fuel off gas led to the exhaust and drain valve 80 becomes lower than the supply pressure value of the fuel gas. Thus, in a case where the exhaust and drain valve 80 is the closed state, the first load is larger than the third load. Accordingly, when the first chamber R1 is open to the atmosphere, the sealing force of the second embodiment is increased, as compared with the related art in which the first load and the third load becomes equivalent to each other.

According to the second embodiment, the fuel cell system 1 includes the branch pipe 131$d$ which is the valve in which the first end is connected to the fuel system supply pipe 31$a$, and the second end is connected to the first port 81$a$1, and which supplies the fuel gas to the first chamber R1. In addition, the fuel cell system 1 is further provided with a fuel system circulation path 31$c$ connects a portion between the fuel cell 4 and the exhaust and drain valve 80 in the fuel system discharge pipe 31$b$ and the fuel system supply pipe 31$a$; and a circulation pump 37 is disposed in the fuel system circulation path 31$c$, and supplies the fuel off gas to the fuel system supply pipe 31$a$ from the fuel system discharge pipe 31$b$. The exhaust and drain valve 80 is disposed in the fuel system discharge pipe 31$b$ so as to introduce from the third port 81$b$2 and lead out the fuel off gas and the water to the second port 81$b$1. The branch pipe 131$d$ is a valve in which the first end is connected to the fuel system supply pipe 31$a$, and the fuel gas is supplied to the first chamber R1.

According to this aspect, the fuel gas of the fuel system supply pipe 31$a$ is supplied to the first chamber R1 of the exhaust and drain valve 80 via the branch pipe 131$d$. In addition, the fuel off gas is supplied to the fuel system supply pipe 31$a$ as a fuel gas via the fuel system circulation path 31$c$. That is, a portion of the fuel off gas is circulated as a fuel gas around the fuel cell 4, the fuel system discharge pipe 31$b$ (the first fuel system discharge pipe 31$b$1), the fuel system circulation path 31$c$, and the fuel system supply pipe 31$a$. Accordingly, in a case where the exhaust and drain valve 80 is in the closed state, the pressure value of the fuel off gas which acts on the second chamber R2 and the lower side surface 82$b$2 of the diaphragm portion 82$b$ via the fuel system discharge pipe 31$b$ (the second fuel system discharge pipe 31$b$2) becomes lower than the supply pressure value of the fuel gas which acts on the first chamber R1 and the upper side surface 82$b$1 of the diaphragm portion 82$b$ via the branch pipe 131$d$. With this, as compared with the case where the first chamber R1 is open to the atmosphere as in the related art, the first load is larger than the third load, and thus the sealing force is increased. Accordingly, it is possible to reliably improve the sealability of the exhaust and drain valve 80.

Modified Example

Note that, in the above-described embodiments, an example of the fuel cell system is described; however, this disclosure is not limited thereto, and other configurations can be applied. For example, in the above-described first embodiment, although the pressure loss portion is the cathode flow path 42 and the air pressure control valve 26, an orifice may be used instead.

In addition, in the above-described first embodiment, the exhaust and drain valve 80 is connected to the fuel system discharge pipe 31$b$ so as to introduce the fuel off gas and the water from the second port 81$b$1 and lead out the fuel off gas and the water to the third port 81$b$2. Specifically, the second fuel system discharge pipe 31$b$2 is connected to the second port 81$b$1, and the third fuel system discharge pipe 31$b$3 is connected to the third port 81$b$2. In contrast, the exhaust and drain valve 80 may be connected to the fuel system discharge pipe 31$b$ so as to introduce the fuel off gas and the water from the third port 81$b$2 and lead out the fuel off gas and the water to the second port 81$b$1. Specifically, the second fuel system discharge pipe 31$b$2 is connected to the third port 81$b$2, and the third fuel system discharge pipe 31$b$3 is connected to the second port 81$b$1. In this case, the supply pressure of the oxidant gas, the supply pressure of the fuel gas, and the discharge pressure of the fuel off gas are adjusted so as to increase the sealing force as compared with the related art.

In addition, in the above-described second embodiment, the exhaust and drain valve 80 is connected to the fuel system discharge pipe 31$b$ so as to introduce the fuel off gas and the water from the third port 81$b$2, and lead out the fuel off gas and the water to the second port 81$b$1. Specifically, the second fuel system discharge pipe 31$b$2 is connected to the third port 81$b$2, and the third fuel system discharge pipe 31$b$3 is connected to the second port 81$b$1. In contrast, the exhaust and drain valve 80 may be connected to the fuel system discharge pipe 31$b$ so as to introduce the fuel off gas and the water from the second port 81$b$1, and lead out the fuel off gas and the water to the third port 81$b$2. Specifically, the second fuel system discharge pipe 31$b$2 is connected to the second port 81$b$1, and the third fuel system discharge pipe 31$b$3 is connected to the third port 81$b$2. In this case, so as to the sealing force is increased as compared with the related art, the supply pressure of the oxidant gas, the supply pressure of the fuel gas, and the discharge pressure of the fuel off gas are adjusted.

Further, in the above-described embodiments, in the fuel system 3, although the fuel system circulation path 31$c$ and the circulation pump 37 are provided so as to circulate the fuel off gas, the fuel system circulation path 31$c$ and the circulation pump 37 may be not provided instead. In this case, in the second embodiment, the orifice may be provided as the pressure loss portion in the fuel system discharge pipe 31$b$. In addition, a flow path cross-sectional area may be set such that the anode flow path 41 is formed as a pressure loss portion.

Further. In the above-described embodiments, although the valve body and the diaphragm disclosed herein are formed integrally as a diaphragm valve body 82, the valve body and the diaphragm may be independently provided. For example, a valve body may be provided at the lower end portion of the plunger 83$f$ by causing the diaphragm portion 82$b$ to pass through the plunger 83$f$.

In addition, without departing from the scope disclosed herein, the positions of the branch pipes 21$d$ and 131$d$ and the lead-out pipes, the shapes of the housing 81, the valve portion 82$a$ (valve body), the diaphragm portion 82$b$ (diaphragm), the valve seat 81$b$3, and the driving methods of the plunger 83$f$ in the drive portion 83 may be changed.

A fuel cell system according to an aspect of this disclosure includes: a fuel cell which performs electric power generation by using a fuel gas containing hydrogen and an oxidant gas; a first supply pipe which supplies the fuel gas to the fuel cell; a first discharge pipe which discharges a fuel off gas and water led out from the fuel cell, by electric power generation of the fuel cell, to the outside; a second supply pipe which supplies the oxidant gas to the fuel cell; and an exhaust and drain valve which is disposed in the first discharge pipe, and regulates or allows the fuel off gas and the water to be discharged to the outside, in which the exhaust and drain valve includes a housing which is provided with a valve chamber therein; a valve body which is disposed in the valve chamber, and is provided to be movable between a first position and a second position which is different from the first position in a first direction; a diaphragm which is disposed so as to partition the valve chamber into a first chamber and a second chamber constituting a portion of the first discharge pipe, is connected to the valve body, and is provided in a film shape bent in accordance with the movement of the valve body; a first port which is provided to communicate with the first chamber in the housing; a second port and a third port which are provided to communicate with the second chamber in the housing, and constitute a portion of the first discharge pipe; and a valve seat which is provided in an opening portion of the second port in the second chamber, comes in contact with the valve body so as to regulate the discharge in a case where the valve body is positioned at the first position, and is separated from the valve body so as to allow the discharge in a case where the valve body is positioned at the second position, and the fuel cell system includes a branch pipe, a first end of which is connected to one of the first supply pipe and the second supply pipe, a second end of which is connected to the first port, and which supplies one of the fuel gas and the oxidant gas to the first chamber.

According to the aspect of this disclosure, the branch pipe supplies one of the fuel gas and the oxidant gas to the first chamber of the exhaust and drain valve, and thus one of a supply pressure of the fuel gas and a supply pressure of the oxidant gas acts on the first chamber. Accordingly, as compared with the case where the first chamber is open to the atmosphere as in the related art, the pressure acting on the first chamber can be large. In addition, the pressure of the first chamber acts in the direction allows the valve body and the valve seat to be in contact with each other in the first direction with respect to the diaphragm. Accordingly, it is possible to improve the sealability of the exhaust and drain valve.

The fuel cell system according to the aspect of the invention may be configured such that the fuel cell system further includes a lead-out pipe to which the oxidant gas is introduced from the second supply pipe and which leads out the oxidant gas in a portion of the secondary side of the exhaust and drain valve of the first discharge pipe; and a pressure loss portion which is provided in the lead-out pipe, and causes pressure loss in the oxidant gas, the exhaust and drain valve is disposed in the first discharge pipe so as to introduce the fuel off gas and the water from the second port and lead out the fuel off gas and the water to the third port, and, in the branch pipe, the first end is connected to the second supply pipe and the oxidant gas is supplied to the first chamber.

The fuel cell system according to the aspect of the invention may be configured such that the pressure loss portion is an oxidant gas flow path which allows the oxidant gas in the fuel cell to flow.

The fuel cell system according to the aspect of the invention may be configured such that the fuel cell system further includes a connecting pipe which connects a portion between the fuel cell and the exhaust and drain valve in the first discharge pipe and the first supply pipe to each other; and a fuel off gas discharging device which is disposed in the connecting pipe, and supplies the fuel off gas from the first discharge pipe to the first supply pipe, the exhaust and drain valve is disposed in the first discharge pipe so as to introduce the fuel off gas and the water from the third port and lead out the fuel off gas and the water to the second port, and, in the branch pipe, the first end is connected to the first supply pipe, and the fuel gas is supplied to the first chamber.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A fuel cell system comprising:
a fuel cell which performs electric power generation by using a fuel gas containing hydrogen and an oxidant gas;
a first supply pipe which supplies the fuel gas to the fuel cell;
a first discharge pipe which discharges a fuel off gas and water led out from the fuel cell, by electric power generation of the fuel cell, to the outside;
a second supply pipe which supplies the oxidant gas to the fuel cell; and
an exhaust and drain valve which is disposed in the first discharge pipe, and regulates or allows the fuel off gas and the water to be discharged to the outside,
wherein the exhaust and drain valve includes
a housing which is provided with a valve chamber therein,
a valve body which is disposed in the valve chamber, and is provided to be movable between a first position and a second position which is different from the first position in a first direction,
a diaphragm which is disposed so as to partition the valve chamber into a first chamber and a second chamber constituting a portion of the first discharge pipe, is connected to the valve body, and is provided in a film shape bent in accordance with the movement of the valve body,
a first port which is provided to communicate with the first chamber in the housing,
a second port and a third port which are provided to communicate with the second chamber in the housing, the second chamber constituting a portion of the first discharge pipe, and
a valve seat which is provided in an opening portion of the second port in the second chamber, comes in contact with the valve body so as to regulate the discharge in a case where the valve body is positioned at the first position, and is separated from the valve body so as to allow the discharge in a case where the valve body is positioned at the second position, and
the fuel cell system further comprises a branch pipe, a first end of which is connected to one of the first supply pipe and the second supply pipe, a second end of which is connected to the first port, and which supplies one of the fuel gas and the oxidant gas to the first chamber.

2. The fuel cell system according to claim 1, further comprising:
a lead-out pipe to which the oxidant gas is introduced from the second supply pipe and which leads out the oxidant gas in a portion of a secondary side of the exhaust and drain valve of the first discharge pipe; and a pressure loss portion which is provided in the lead-out pipe, and causes pressure loss in the oxidant gas, wherein the exhaust and drain valve is disposed in the first discharge pipe so as to introduce the fuel off gas and the water from the second port and lead out the fuel off gas and the water to the third port, and in the branch pipe, the first end is connected to the second supply pipe and the oxidant gas is supplied to the first chamber.

3. The fuel cell system according to claim 2, wherein the pressure loss portion is an oxidant gas flow path which allows the oxidant gas in the fuel cell to flow.

4. The fuel cell system according to claim 1, further comprising:

a connecting pipe which connects a portion between the fuel cell and the exhaust and drain valve in the first discharge pipe and the first supply pipe to each other; and a fuel off gas discharging device which is disposed in the connecting pipe, and supplies the fuel off gas from the first discharge pipe to the first supply pipe, wherein the exhaust and drain valve is disposed in the first discharge pipe so as to introduce the fuel off gas and the water from the third port and lead out the fuel off gas and the water to the second port, and in the branch pipe, the first end is connected to the first supply pipe, and the fuel gas is supplied to the first chamber.

* * * * *